United States Patent
Martinez

(10) Patent No.: US 8,310,512 B2
(45) Date of Patent: Nov. 13, 2012

(54) METHOD OF STRONG IMAGES AND CORRESPONDING STORAGE MEDIUM

(75) Inventor: Christophe Martinez, Grenoble (FR)

(73) Assignee: Commissariat a l'Energie Atomique (FR)

( * ) Notice: Subject to any disclaimer, the term of this patent is extended or adjusted under 35 U.S.C. 154(b) by 634 days.

(21) Appl. No.: 12/400,843

(22) Filed: Mar. 10, 2009

(65) Prior Publication Data

US 2009/0243155 A1    Oct. 1, 2009

(30) Foreign Application Priority Data

Mar. 28, 2008   (FR) ...................................... 08 01716

(51) Int. Cl.
*B41J 2/455* (2006.01)
(52) U.S. Cl. ......................... 347/233; 347/240; 347/254
(58) Field of Classification Search .......... 347/224–225, 347/239, 240, 251–254, 256, 258, 233
See application file for complete search history.

(56) References Cited

U.S. PATENT DOCUMENTS

| | | | | |
|---|---|---|---|---|
| 6,128,090 A | * | 10/2000 | hunsel et al. | ................... 356/402 |
| 6,442,296 B1 | | 8/2002 | Smith et al. | |
| 2005/0046817 A1 | | 3/2005 | Wolfe et al. | |
| 2006/0203861 A1 | * | 9/2006 | Ogawa | ............................ 372/24 |

FOREIGN PATENT DOCUMENTS

| | | |
|---|---|---|
| EP | 1 310 950 A2 | 5/2003 |
| JP | 58121145 | 7/1983 |
| JP | 2001256646 | 9/2001 |

* cited by examiner

*Primary Examiner* — Julian Huffman
*Assistant Examiner* — Sharon A Polk
(74) *Attorney, Agent, or Firm* — Lowe Hauptman Ham & Berner, LLP

(57) ABSTRACT

The invention relates to a method of storing images on a medium able to be etched on the basis of a writing procedure using a laser beam, in which a substrate, preferably flexible, comprises a multiplicity of expanses of lateral dimensions less than 10 millimeters, each reserved for an image, and an expanse reserved for an image comprises as many elementary zones as there are image pixels to be stored, the image stored in an expanse being able to be read by optical magnification means. Each elementary zone comprises an engraved pattern whose diameter represents one respective grey level out of n possible levels.

4 Claims, 8 Drawing Sheets

METHOD OF STRONG IMAGES AND CORRESPONDING STORAGE MEDIUM

RELATED APPLICATIONS

The present application is based on, and claims priority from, French Application Number 08 01716, filed Mar. 28, 2008, the disclosure of which is hereby incorporated by reference herein in its entirety.

FIELD OF THE INVENTION

The invention relates to the storage of images with a view to very high density archiving.

BACKGROUND OF THE INVENTION

Photographs are increasingly produced by electronic methods of image capture and are stored in their original format, compressed or otherwise. It is in this form that they are preserved in general, on storage media such as computer hard disks, or recordable digital optical disks (CD ROM, DVD, etc.), or else flash memories. Currently most of the general public's digital photographs are stored in this way.

The question of the permanence of these storage means arises, firstly with regard to the lifetime of these media; a hard disk has an estimated lifetime of a few years with the continual risk of a total failure; recordable optical storage media have estimated lifetimes of several tens of years when not in use; during use, the appearance of scratches can dramatically reduce the lifetime. But the question also arises with regard to the permanence of the coding formats which may become obsolete over long storage durations and notably when concerned with the archiving of images.

U.S. Pat. No. 6,442,296 has already proposed that the raw image be etched directly onto a medium of microfilm type or an optical disk. The raw image is etched in a very reduced space by direct writing with a laser, each image pixel is represented by engraved or non-engraved points. If the image is coloured several images are stored, corresponding to the decomposition of the initial image into three primary colours. If the image contains grey levels, the pixels are downscaled by screening: a pixel is represented by several engraved or non-engraved points. The images can be recovered by a reading method not relying on the use of a decoder and they can also be observed directly by microscope.

Patent EP1310950 describes the same principle of direct archiving of images on an optical disk. The images are engraved by near-field writing optics and can be observed directly by microscope.

SUMMARY OF THE INVENTION

The aim of the present invention is to allow the storage of uncoded raw images at very high density, by a very fast writing method, permitting an image content comprising grey levels.

The writing is direct laser writing, with fast scanning of the spot over the surface to be engraved. According to the invention, the grey level information is engraved in the form of a dimension (lateral dimension or area) of pattern from among several possible dimensions each representing a respective grey level. The variable dimension of pattern is obtained by acting notably on the power of the laser beam, and/or on the size of the focusing spot of the beam on a sensitive layer.

The invention consequently proposes a method of storing images at high density on a medium able to be etched on the basis of a writing procedure using a laser beam, in which a writing zone comprises a multiplicity of expanses of lateral dimensions less than 10 millimeters each reserved for an image, and an expanse reserved for an image comprises as many elementary zones as there are image pixels to be stored, the image stored in an expanse being able to be observed by optical magnification means, characterized in that the elementary zones comprise patterns engraved in the form of spots of different diameters, a diameter value representing one respective grey level out of n possible levels (n an integer greater than 2). The spot not being exactly circular, the word "diameter", usually reserved for a perfect circle, is considered here to be the diameter of a circle approximately representing the spot.

One or more laser beams having different numerical apertures can be used to engrave patterns of spots in ranges of different diameters; it is preferable to use several beams to which are assigned different focal spot sizes or ranges of different focal spot sizes; in this way the information can be engraved more rapidly. However, it is also possible to envisage different diameter patterns being obtained with a single laser beam, by modulating the power of the laser, and it is possible to envisage a mixed system in which there are several laser beams corresponding to ranges of different focal spot sizes, each laser being able to be modulated in power; as a function of a grey level received for a determined pixel, a pattern diameter corresponding to this grey level is defined both through the choice of a laser corresponding to a given range of pattern diameters and through the choice of an emission power of this laser.

The engraving by a laser beam is done directly on the storage medium if the latter comprises a sensitive layer able to permanently record information engraved by a laser. It can also be done indirectly in two phases: engraving in a provisional layer sensitive to the laser beam (a photosensitive resin) followed by a step of developing the sensitive layer and of etching a permanent storage layer situated under the provisional sensitive layer. In this case, the patterns formed by the laser beam are reproduced in the permanent storage layer.

The scanning of the laser beam over the surface to be engraved can be done either over a plane surface such as that of an optical disk; the disk rotates about an axis perpendicular to its surface and the scan is spiral, the laser beam is directed parallel to the axis of rotation, moving in translation along a straight line parallel to the surface of the disk while the disk rotates;

or over a cylindrical surface and in the latter case, a flexible storage medium will preferably be used, which can be applied to the cylindrical surface during writing and then mounted in a rigid plane frame after writing; the laser beam is directed towards the cylindrical surface and moves in translation parallel to the axis of rotation of the cylinder while the latter rotates;

or else over a plane surface which travels past like a magnetic tape driven by rolls; the laser beam is directed perpendicularly to this surface and moves in translation parallel to this surface and perpendicularly to the direction of travel of the surface; here again a flexible medium will be used, held in place on a drive band.

Provision may be made for an elementary zone corresponding to a pixel to comprise a single spot having a diameter from among n=N if N is the desired total number of grey levels; or else provision may be made for the elementary zone to be divided into K sub-zones each able to receive a pattern having a diameter taken from among n=N/K possible diameters, where N is again the total number of grey level desired for each pixel.

In addition to this method, the invention also relates to a system for storing images on a substrate which is writable by means of a writing laser, the images being stored in analogue form, readable by optical magnification means, in a writing zone comprising a multiplicity of expanses of dimensions less than 10 millimeters by 10 millimeters, each corresponding to a very small format image not observable with the naked eye, each expanse comprising as many elementary zones as there are pixels of the image to be stored; the system is characterized in that it comprises a laser beam optical head and optical head control means able to receive, for the writing of each pixel, information regarding the grey level of the pixel, and able to control the engraving by the head, in an elementary zone corresponding to the pixel, of a pattern having a diameter determined from among n diameters each representing one respective grey level out of n possible levels, n being an integer greater than 2. Several lasers can be focused by respective optics of different numerical apertures placed at different heights above the storage substrate. A determined laser is selected as a function of the grey level received.

In the case where the laser-sensitive layer is formed on a potentially fragile flexible substrate, this medium will preferably be placed between two plates that are transparent in the visible but opaque in the ultraviolet. The plates are held mechanically by assembling a frame in two parts, just as is done in transparencies. This plastic frame can comprise fields making it possible to advise as to the general content of the medium, either in readable form (character strings, colour code, etc.) or in digital form (bar code) so as to allow good management. A remote communication microchip of RFID (Radio Frequency Identification) type for remote referencing can also be integrated with the plastic frame.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DESCRIPTION OF PREFERRED EMBODIMENTS

A digital photograph corresponds to a mesh of digital data whose elementary mesh unit is the pixel. To each pixel of the image there corresponds a grey value which ranges over a coding scale expressed in bits. An image stored with 8 bits has a scale of $2^8=256$ grey levels. An image can comprise a few hundred thousand to a few million pixels, depending on the resolution of the apparatus which took it.

Figure 1:
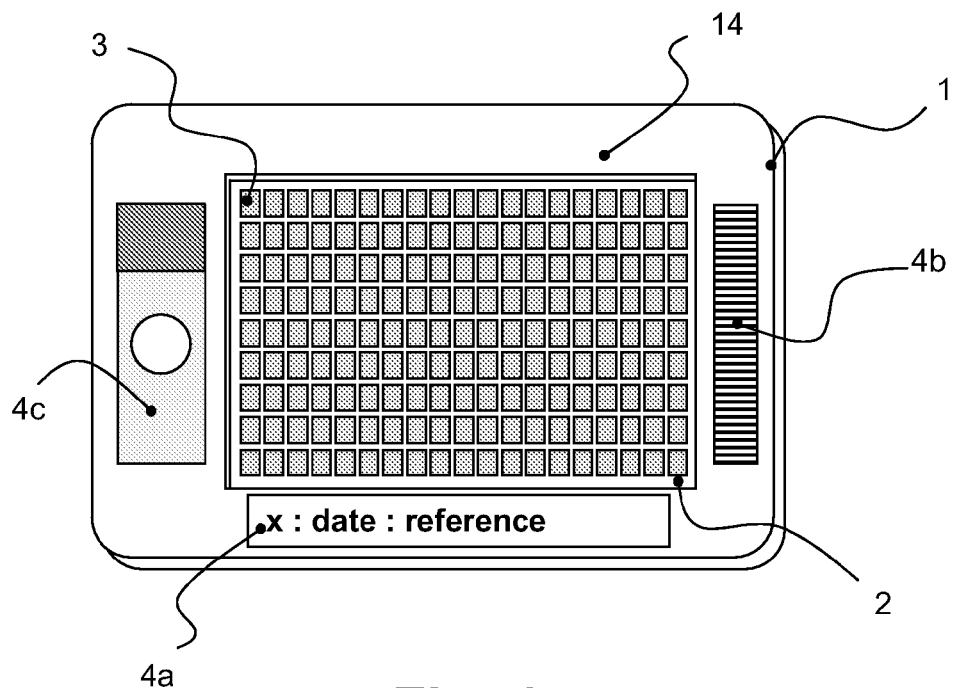
FIG. 1 describes an exemplary storage medium in accordance with the invention.
Figure 2:
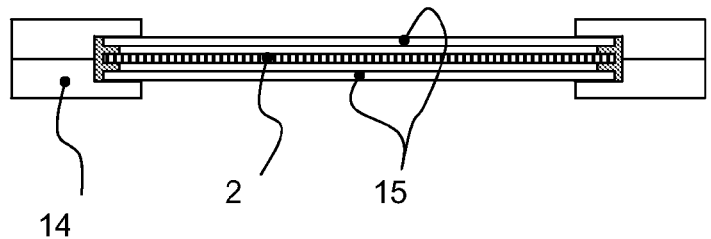
FIG. 2 describes a section of the storage medium of the invention.

FIG. 1 represents an end-on view of a long duration storage medium 1. FIG. 2 represents this medium in lateral section. It comprises a substrate 2 containing an active storage zone. The substrate is in this example a flexible substrate held in place in a frame 14. The format can be a few centimeters by a few centimeters for example. This storage medium is intended to be read with the aid of a microscope whose magnifying power is related to the smallness of the images which have been stored. The images are in fact engraved directly, in observable form and not in coded form, on the substrate.

Each image is stored in a writing expanse 3 of the substrate 2. By way of example, an image can have lateral dimensions of the order of a millimeter, for example from 1 to 5 millimeters along a side, thereby making it possible to store several hundred images on a medium. These images are not observable with the naked eye; they are observable through a microscope or a projector of large magnification.

The substrate 2 is preferably made of flexible plastic and can be protected by a frame 14 enclosing the substrate between two rigid protective plates 15, which can be transparent to visible light but without allowing through the ultraviolet which could impair the medium in the long term. This frame also makes it possible to place labels for referencing the medium, in analogue or digital format. It can also comprise zones reserved for other identification data, for example a series of characters (4a), a digital code (bar code type) 4b, a colour code (4c).

Figure 3:
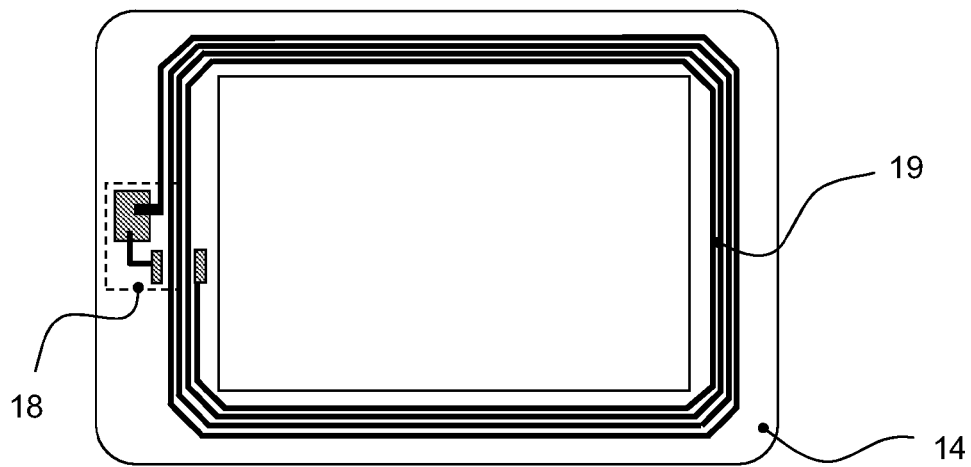
FIG. 3 describes the case of a storage medium in accordance with the invention in which an RFID microchip is inserted.

In the case of a professional application where a large number of media would be envisaged it is also possible to include within the frame remote referencing means of RFID (Radio Frequency Identification) type in the form of a microchip 18 and antenna 19 (FIG. 3).

Figure 4:
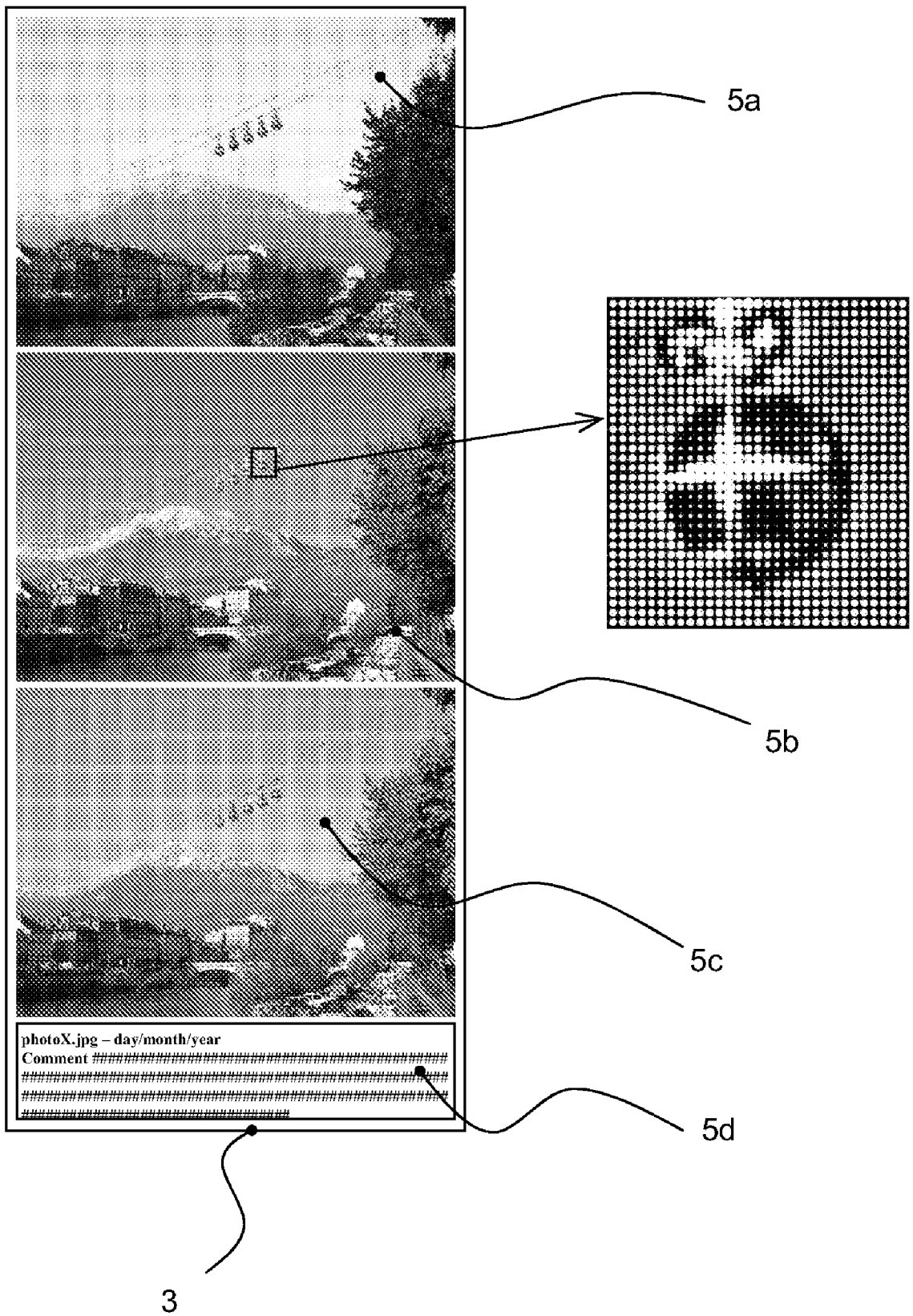
FIG. 4 illustrates the zone for storing an image in the storage medium of the invention.

If the image is coloured, partial images corresponding to each primary colour will be extracted from the image and stored separately in one and the same writing expanse 3 assigned to this image, or in three neighbouring expanses. FIG. 4 symbolically represents three representations 5a, 5b and 5c, red, green, blue of one and the same image of a landscape. The writing expanse 3 can also comprise a part 5d where information relating to the image can be written physically, and in an manner observable by the human eye after magnification; this information can notably be information which is provided in digital form by the snapshot apparatus and converted into writing readable by the human eye; this information is typically the snapshot date, the focal length, the aperture, etc. as well as any comments added by the user.

Each image is engraved in the substrate 2 pixel by pixel by a series of elementary patterns having various surface extents; these patterns are each engraved in a respective elementary zone assigned to the pixel currently being written; these patterns are spots of different diameters; the diameter of the engraved spots is directly related to the grey level of the pixel. Depending on the nature of the medium, these patterns can be apertures in an opaque background, or opaque patterns in a transparent background, or reflecting patterns on an absorbent or transparent background, or absorbent or transparent patterns on a reflecting background. For each image pixel, the diameter and the surface extent of the pattern are directly linked to the value of the grey level of the pixel corresponding thereto as shown, in FIG. 2, by the magnification of a small part of the image. The size of the elementary patterns inside each pixel will be returned to later.

The patterns will be engraved in the substrate 2 by a direct writing laser beam scanning the surface of the substrate. They are engraved either directly in a permanent storage layer or in a provisional layer which serves to etch a permanent layer.

The spatial resolution of the writing machine will define the distance between the patterns and therefore the amount of information that may be stored on a given surface.

Numerical Example

This is based on the image distribution such as presented in FIG. 4 in the case of the representation of a photograph of 3 million pixels. This format generally has a mesh of 2048× 1536 pixels. A cell boundary and a distance between the images equal to 100 pixels are chosen. A size of 2048×512 pixels is chosen for the comment zone.

The size of the cell 3 is calculated as a function of the chosen spacing p between the patterns from pixel to pixel.

$$S_{cell} = [(2048+200) \times p] \times [(3 \times 1536+500+512) \times p]$$

For a spacing p=0.8 µm we have a cell of size: 1.8 mm×4.5 mm.

A storage substrate of size 4.5 cm×9 cm therefore makes it possible to preserve 500 colour photographs at 3 Mpixels (1 million pixels per colour) if it is possible to engrave a pixel's grey information in a space of 0.8×0.8 micrometers square. The laser writing on a sensitive layer makes it possible to do so.

Figure 5:
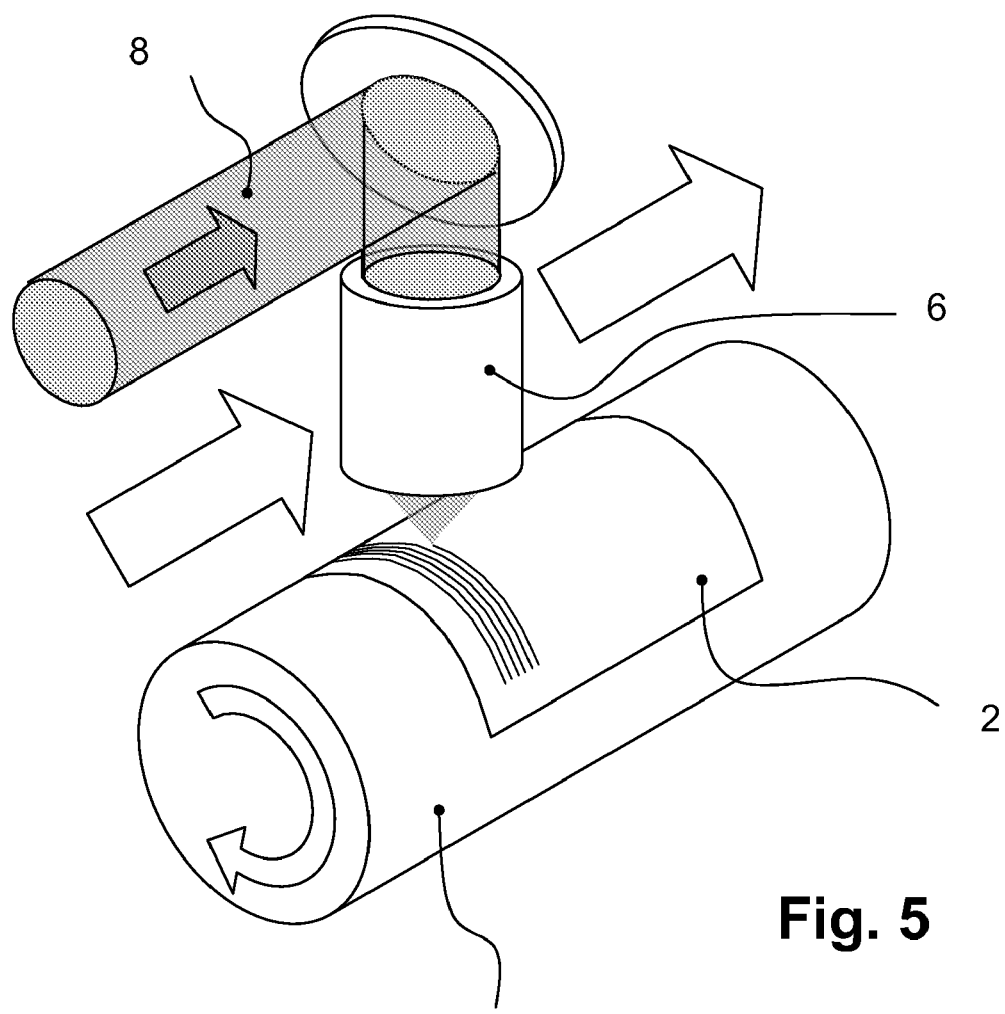
FIG. 5 describes the writing method in the case of a flexible storage medium mounted on a cylinder.

FIG. 5 schematically describes the principle of manufacturing the storage medium. It involves laser direct writing equipment, based on translating an optical head 6 with respect to a mobile drum 7 set into rotation. The flexible storage substrate 2 is applied against the drum 7 and the laser beam 8 generated and focused by the optical head 6 scans its surface. The optical head 6 comprises an optical part for shaping the writing beam and an opto-mechanical part, not represented, which guarantees that the focusing point is held at the substrate level in a given depth of field range, while ensuring the longitudinal displacement of the head. This displacement is parallel to the axis of rotation of the drum and can be done stepwise or continuously. Writing is done line by line during the rotation of the drum.

Figure 6:
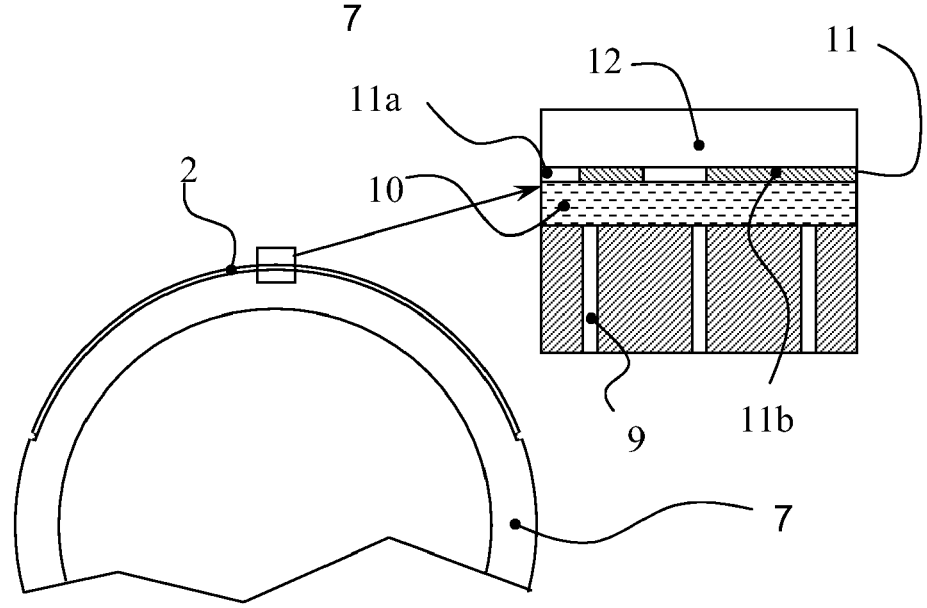
FIG. 6 describes an embodiment of the fixing of the storage medium of the invention on the writing drum.

FIG. 6 shows that the flexible substrate 2 can be held in place against the drum during writing by a suction system 9. The storage substrate 2 comprises a substrate proper 10 covered with a sensitive layer 11 itself covered optionally by a transparent protective layer 12 on the side where the writing laser beam is applied. The substrate 10 is made of organic material (for example a polymer which can be thermoplastic). The layer 11 is an active layer, sensitive to the optical or thermal action of the writing laser beam. It will be understood that the layer 11 present during writing is not necessarily the layer comprising the information at the end of manufacture: there may be intermediate steps for producing a storage layer on the basis of the layer sensitive to the writing laser beam as will be explained later.

The engraved image information has been represented by dark parts 11a and light parts 11b, that is to say the parts 11b are zones in which an optical or thermal action has been exerted by the laser beam and the parts 11a are zones in which there has been no such action.

Figure 7:
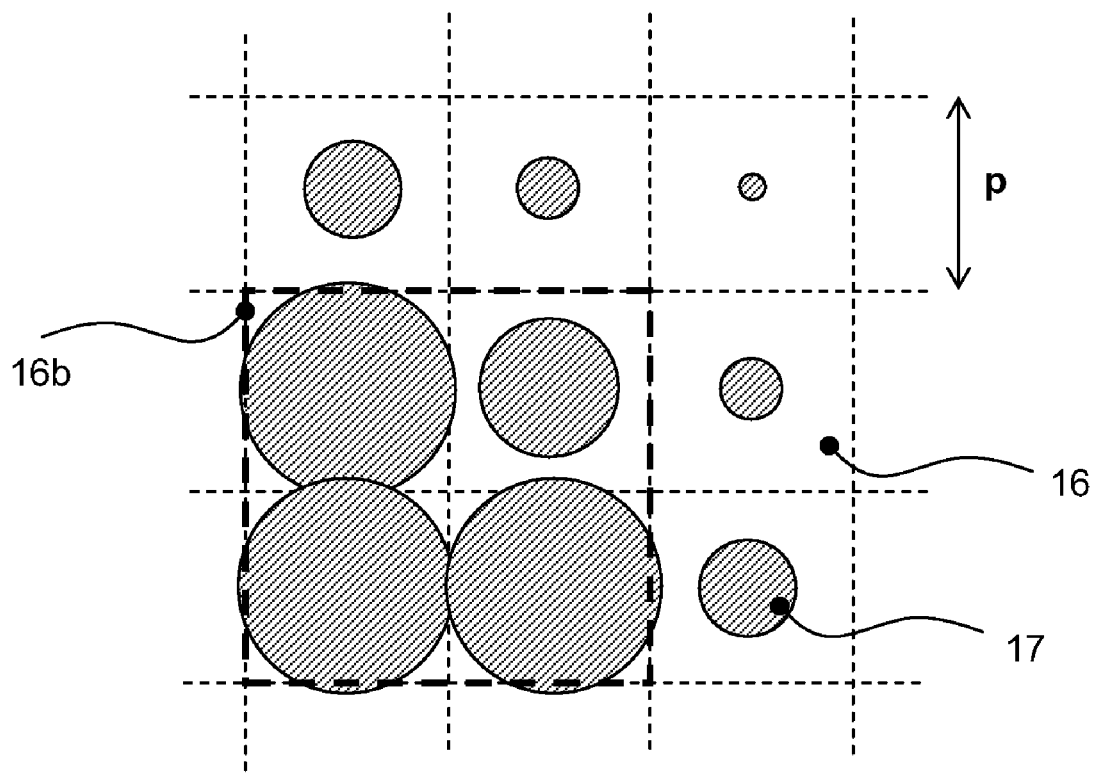
FIG. 7 describes the mode for coding the grey levels of the image pixels by modifying the surface of a pattern.

FIG. 7 describes an embodiment of the analogue coding of the data. Each pixel of the image is characterized by a value Vng, termed the grey level, defined on a scale going from 0 to $N=(2^{nb}-1)$ where nb is the number of coding bits. This value is provided in digital form by the snapshot apparatus, and it forms part of the digital file representing the image, on the basis of which file the storage will be performed.

Each pixel 16 corresponds to a square elementary zone (it could be rectangular) of side p which contains a pattern 17 engraved by the writing laser; the dimension of this pattern (in practice its area) depends on the grey level desired for the pixel considered. This pattern is ideally circular for reasons of manufacturing simplicity, but it can also be elliptical. If it is circular, this being the simplest, its size is given by a diameter value ranging between a minimum diameter $D_{min}$ and maximum diameter $D_{max}$. The number n of possible diameters from $D_{min}$ to $D_{max}$ is $2^{nb-1}$. The maximum size $D_{max}$ can be equal to the side p of the square defining the pixel, or even more if it is desired to increase the fill ratio. To have a good fill ratio, the pixels are adjacent, that is to say the side of the square defining the pixel is equal to the pixel distribution spacing p, row-wise and column-wise (the spacing possibly being different row-wise and column-wise if the pixels are of elliptical form). The diameter of the largest engraved patterns can be $2^{1/2}$ times the spacing p so as to obtain complete coverage of adjacent pixels all having the grey level corresponding to the largest pattern diameter.

The minimum size of the smallest engraved patterns is $D_{min}$ and will be defined with respect to the resolving power of the reading system considered. Pixels of grey level equal to zero will additionally correspond to a complete absence of action by the laser beam for a pixel (turn-off or significant reduction in power below a threshold).

It is also possible to envisage distributing the information over several sub-pixels to increase the range of grey levels or to facilitate the formation of patterns of different surface extent for one and the same number N of grey levels: the information corresponding to the grey level of a pixel will give rise to a distribution of patterns over several adjacent rectangular zones each corresponding to a part of a pixel. FIG. 7 illustrates this possibility by showing a pixel 16b, surrounded by thicker dashes, divided into four zones, each able to be filled by a pattern of greater or lesser diameter defined by the laser beam. This makes it possible to obtain a more extensive grey level range on the basis of a limited expanse of available pattern diameters, the corollary being a more significant overall image area for a given pattern size $D_{max}$ engravable by a laser beam. In practice, if N is the desired number of grey levels and if each elementary pixel zone is divided into K sub-zones, it is necessary for the writing laser or lasers to be capable of writing patterns having n=N/K possible different diameters, n being greater than 2. The highest grey level will lead to the engraving of a pattern of maximum size $D_{max}$ in each of the sub-zones, culminating in an overall pattern area K times larger than that which can be produced by a single laser beam.

The obtaining of several diameter values of the pattern corresponding to an elementary zone (or a sub-zone) can be carried out in several ways and relies on the size of the focusing spot of the direct writing laser which will serve to create the pattern.

A favoured embodiment uses a phase transition material (PTM). A layer of this material is deposited on the substrate in a first state A (for example amorphous). Local irradiation of this material heats the zone concerned. By following a particular heating and cooling regime, the irradiated zone may, on completion of the luminous exposure, be in another state B (for example crystalline). For certain PTM materials the two states have a different chemical etching selectivity. It is thus possible to dissolve material B without modifying material A. The irradiated pattern is therefore developed. If material A is opaque, the pattern constitutes a hole through which light will be transmitted.

Figure 8:
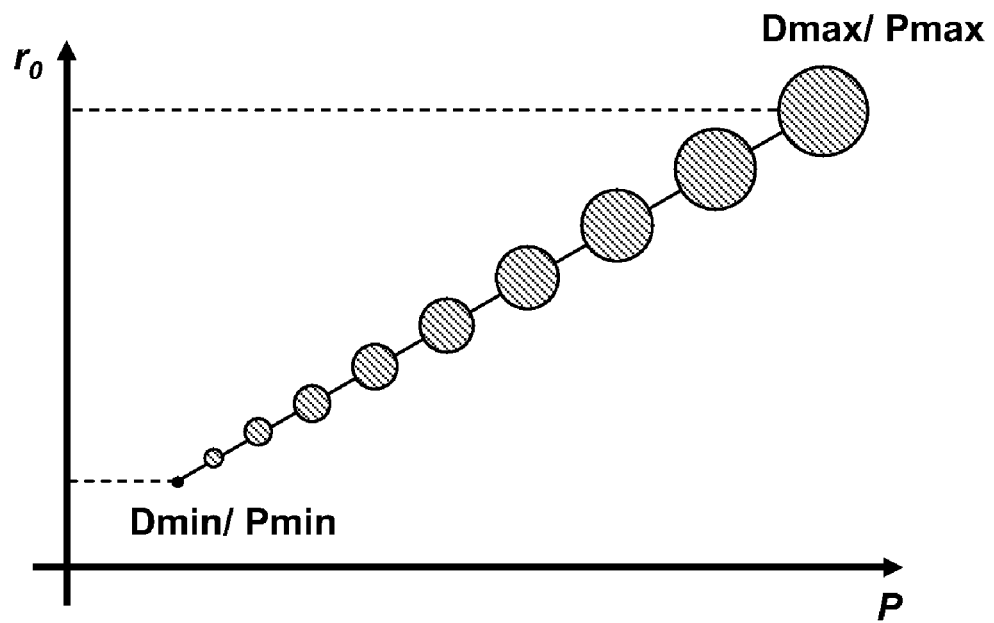
FIG. 8 describes the embodiment in accordance with which the size of the patterns is obtained by changing the power of the writing laser.

A particular property of this type of material is that it reacts to the laser beam only above a light intensity threshold. Let I(r) be the normalized intensity distribution of the light spot, assumed radially symmetric, as a function of the distance r from the axis of the beam. Call Is the material's intensity threshold value above which the change of phase occurs. The radius $r_0$ of the pattern actually engraved is therefore given by the equality:

$$P \frac{I(r_0)}{\int I(r)} = Is$$

where P is the power of the spot. This equation shows that the diameter $2r_0$ of the pattern and therefore its area $\pi r_0^2$ is dependent on the power of the spot. FIG. 8 gives a representation thereof with circular patterns of radius $r_0$ increasing with the power P.

An exemplary material sensitive to the action of a laser is platinum oxide $PtO_x$ (state A) which under irradiation produces a transition to platinum Pt (state B).

Figure 9:
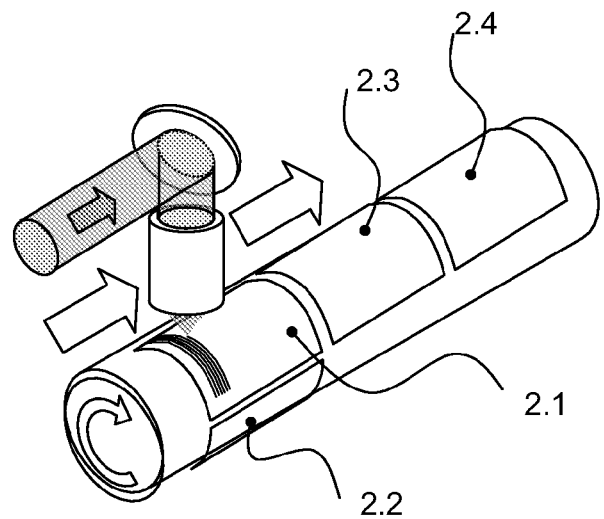
FIG. 9 describes an embodiment of the invention in which several media can be manufactured in series or in parallel for one and the same motion of the drum.

FIG. 9 describes the possibility of irradiating several substrates with the case of a parallel irradiation of two substrates 2.1 and 2.2 and then the irradiation of two substrates in series 2.3 and 2.4.

Numerical Example

Returning to the case of a storage zone of size 4.5 cm×9 cm written at the spacing p of 0.8 μm.

A radius R1 of 3.5 cm is chosen for the rotating drum. Its perimeter is therefore equal to 22 cm. It is thus possible to place two recording substrates for successive writing on the diametrically opposite zones of the drum.

A rotation rate Vrot is taken equal to 3000 revolutions/minute. The laser spot scans the surface of the substrate at the following linear rate Vlin:

$$V_{lin} = \frac{V_{rot} \times 2\pi \times R1}{60}$$

i.e. $Vlin = 11$ m/s.

To guarantee a spacing p, the translation must be performed at the rate Vtrans:

$$V_{trans} = \frac{V_{rot} \times p}{60}$$

i.e. $Vtrans = 40$ μm/s.

For this rate value a writing duration of about 20 minutes is obtained for two storage substrates.

The writing duration for a given substrate size is given directly by the translation rate. The writing duration therefore depends on the spacing p chosen and on the rotation rate of the drum 7.

Figure 10:
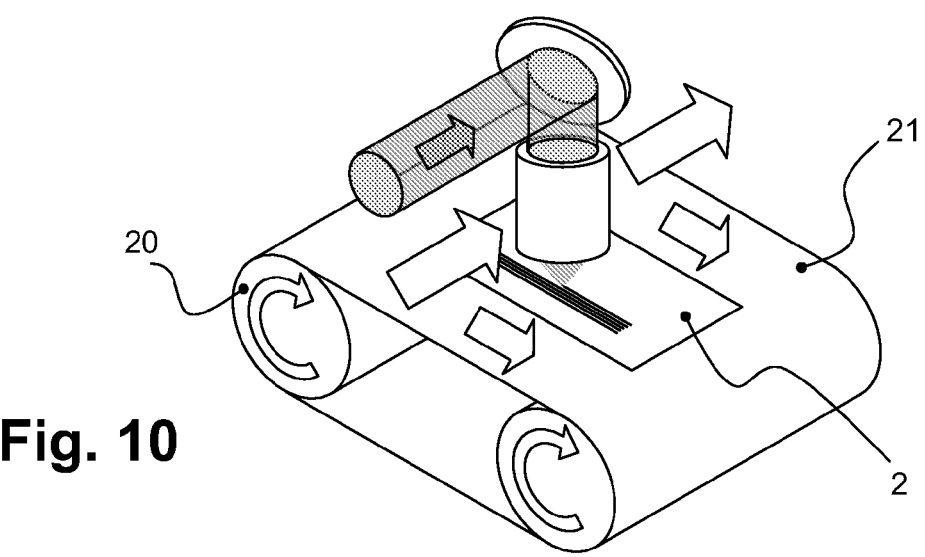
FIG. 10 describes an embodiment in which the storage medium of the invention is driven by a flexible surface stretched between two rolls.

The claimed writing principle can also apply in the case of FIG. 10 where the motion of the storage substrate relative to the laser beam is a translational motion parallel to the substrate which is plane. This motion is obtained by driving a band 21 by means of two parallel identical rolls 20 of radius R1 rotating in the same direction at the rate $V_{rot}$. The storage substrate is placed on the band and driven by it in a direction of travel perpendicular to the axes of the rolls. The read head moves in translation perpendicularly to the direction of travel and parallel to the axes of the rolls.

If D denotes the distance between the axes of the two rolls, the translation rate is expressed by:

$$V_{trans} = \frac{1}{1 + \frac{D}{\pi R1}} \frac{V_{rot} \times p}{60}$$

This configuration makes it possible to render the dimension of the storage zone independent of the perimeter of the roll and therefore of the concept of linear rate. It is therefore possible to position further storage substrates for writing in parallel at a given linear rate.

The concept of linear rate is significant since it gives the value of resolution related to the laser's modulation rate capabilities. It is in fact the alternation between two successive on phases separated by an off phase which makes it possible to create two spatially separated patterns. If fl is the laser modulation frequency, the minimum distance between two patterns is given by:

$$\delta = \frac{V_{lin}}{fl}$$

A source that can be modulated at 500 MHz therefore makes it possible to obtain a spatial resolution of 22 nm which is amply sufficient in the case of a spacing of 0.8 μm between pixels.

The resolution in the longitudinal domain is given by the precision of the translation. Precision of the order of 10 nm is currently available, notably by virtue of the use of precision optical rules.

Figure 11:
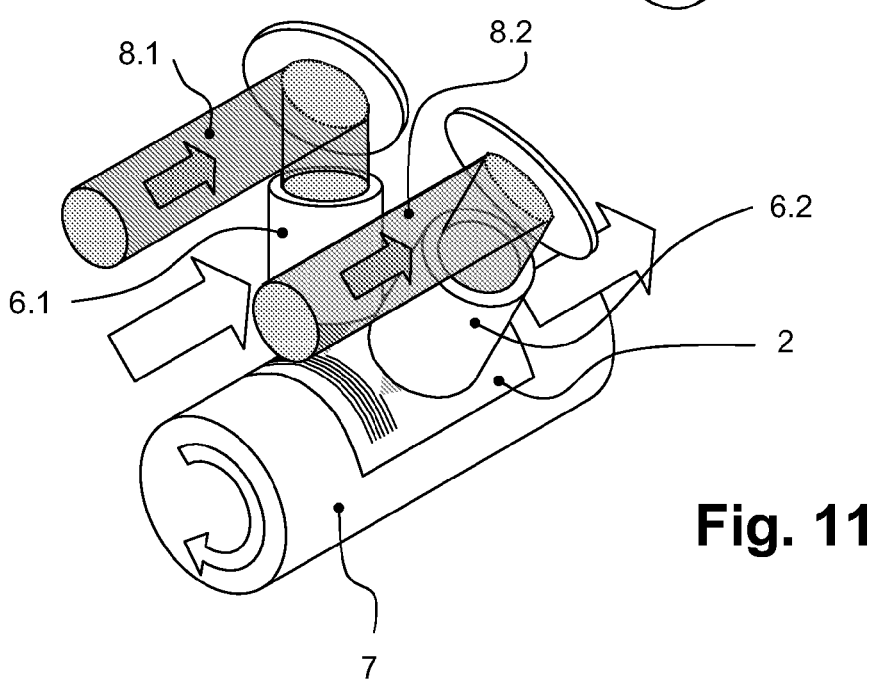
FIG. 11 describes an embodiment in which two write heads are used in series.

FIG. 11 describes the case of irradiation with two write heads 6.1 and 6.2 placed in series in the direction of travel. In this case, the two beams 8.1 and 8.2 are independent from the point of view of the intensity modulation that they undergo. They make it possible for example to write two lines at the same time. A time factor as regards the writing duration is therefore saved, in proportion to the number of heads.

This principle is made possible by virtue of the linearity of the displacement of the writing spot. A spiral motion such as is performed in the conventional writing and reading of optical disks is less well suited to such a configuration.

Figure 12:
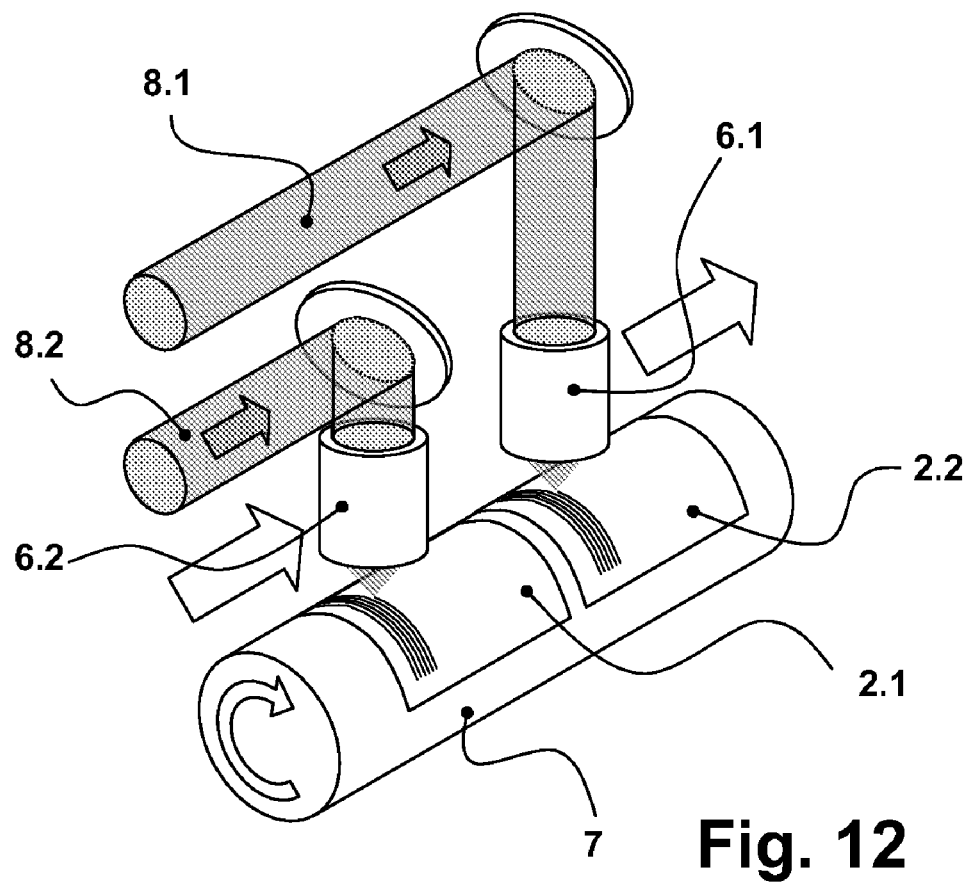
FIG. 12 describes an embodiment in which several write heads are used in parallel.

FIG. 12 is another exemplary use of several write heads. Here the case is that of parallel writing. The beams 8.1 and 8.2 can be independent (writing of two series of different images) so as to achieve a time saving (each head addresses a different zone of the substrate) or to write on two substrates in a given time (each head addresses a substrate 2.$i$). The beams 8.1 and 8.2 can also originate from the same modulated source. In this case the setup makes it possible to duplicate a series of images on two storage zones. This arrangement allowing multiple writing is conceivable in the configurations of FIGS. 10 and 11 also.

In the foregoing, it was considered that the laser of the write head was modulated so as to allow it to create several engraving pattern diameters in accordance with the explanations given with reference to FIG. 7.

However, it is also possible to envisage using several writing laser beams each producing a respective engraved pattern dimension: one laser beam is reserved for the writing of the patterns corresponding to a first diameter, another for the patterns of a second level, and so on. In this case, depending on the grey level to be engraved, the laser on or off modulation signal is applied solely to a laser assigned to this grey level.

Figure 13:
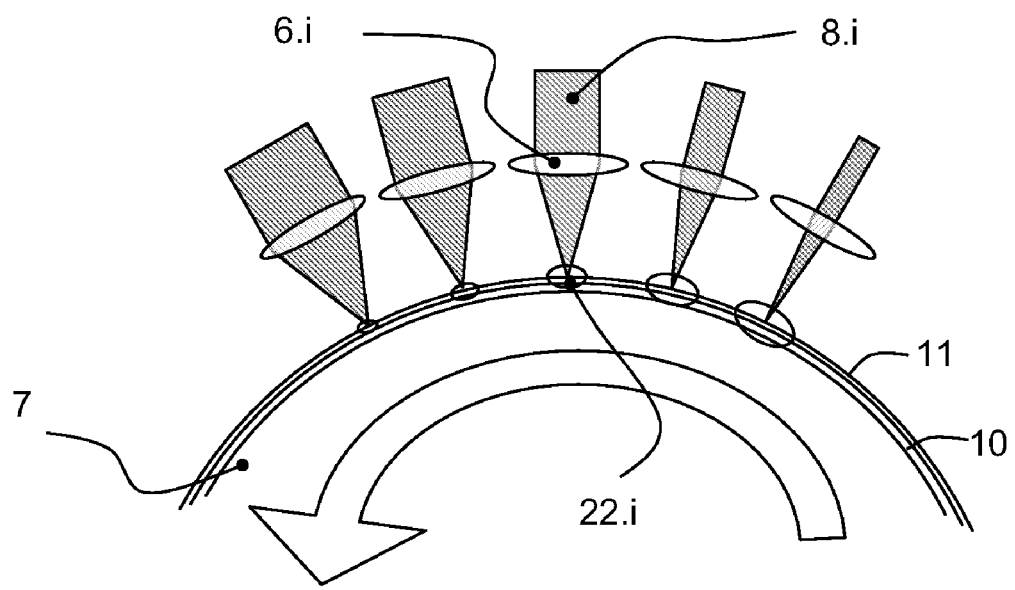
FIG. 13 describes an embodiment in which several write heads of different numerical apertures are used in series.

FIG. 13 describes the principle of such a writing where a laser beam is assigned to a single grey level and to a single pattern dimension. Each laser is turned on or off at a given instant (corresponding to a given elementary zone of the image zone) depending on whether a grey level should or should not be engraved at this location. There are therefore several writing beams 8.$i$ corresponding to the engraving of patterns, increasingly wide from left to right in FIG. 13, in the active layer 11 deposited on its flexible substrate 10 (the protective layer 12 is not represented in FIG. 13). As will be explained later, the dimension of the engraved pattern is related both to the power of the laser beam and to the numerical aperture of the optic which focuses the beam. In the case of FIG. 13, each focusing lens 6.$i$ exhibits its own numerical aperture ONi. As the size of the spot is related to the numerical aperture at a given wavelength, each spot 22.$i$ has a different size.

It is possible to envisage a mixed organization in which there are several laser beams corresponding to different ranges of pattern size, it being possible, however, to modulate each beam in intensity to produce several pattern sizes in the range that it can produce.

Various manufacturing methods can be envisaged for producing the image patterns. They are all based on the principle of photonic structuring (the active layer 11 of the substrate reacts with the photons of the optical beam) or thermal structuring (the active layer of the substrate reacts on account of the heating caused by the optical beam). The sought-after aim is to obtain an optical contrast between the engraved pattern and the background of the substrate. The contrast can be related to a change of reflectivity or of transparency.

The use of an active phase transition layer has been mentioned above. The engraving uses the transition between two states of one and the same material. The transition is a thermal phenomenon. If the change of state of the material results in a change of contrast between an engraved zone and a non-engraved zone, the writing is done directly by the laser without a development step being necessary. If the contrast is too weak or non-existent, the material of the engraved active layer can serve as a mask for etching an subjacent layer which will be removed in the exposed zones and preserved in the non-exposed zones (or the converse). The subjacent layer will exhibit the desired contrast; it can be a chromium layer.

Writing could also be done by using an intermediate photolithography resin, exposed by the reading head according to patterns of variable dimension each corresponding to a grey level. The resin is then developed and serves to etch a reflecting subjacent layer (chromium layer for example) or absorbent subjacent layer which will contain the definitive image.

It is also possible to use photochromic materials of dye type. This photonic structuring makes it possible to modify the contrast of an irradiated zone with respect to a non-irradiated background without resorting to development. The dyes used for recording data in optical disks may be cited by way of example, such as cyanines, phthalocyanine, and azo compounds, a particular feature of which is that they exhibit a marked and irreversible contrast of reflectivity between the zones irradiated via a writing laser, and the non-irradiated adjacent zones.

It is further possible to implement an activation of the surface of a polymer material substrate doped with a metallic agent. The laser beam breaks chemical bonds so that a metallic layer can be deposited on the irradiated zones when the substrate is immersed in an electrolytic solution.

The laser ablation technique can also be employed. A sensitive layer is volatilized under the effect of the laser irradiation. The optical beam can thus create apertures in an opaque or reflecting background.

These methods are given by way of exemplary embodiment. Other methods can be implemented within the framework of the invention.

The obtaining of a grey level coding by the diameter of the pattern corresponding to a pixel will now be returned to in greater detail: no pattern for a black pixel and a pattern size of the order of the spacing p between pixels for a white pixel (or the converse), and intermediate sizes for intermediate grey levels in accordance with the representation of FIG. 7.

The pattern is obtained by laser impact, and it is proposed that the power of this impact be altered so as to modify the size of the pattern.

Hereinafter it is considered that the laser focusing spot comprises an energy distribution with circular symmetry of Gaussian form, but the reasoning would be substantially the same if the distribution were elliptical.

The light intensity is therefore expressed by the formula:

$$I(r) = I_0 \times e^{-2\frac{r^2}{w_0^2}} \quad (1)$$

where r is the distance from a point to the centre of the spot, $I_0$ the maximum intensity of the spot and $w_0$ a size parameter sometimes called the "waist" which characterizes the lateral dimensions of the focused spot. This parameter $w_0$ is approximately the width at mid-height of the energy distribution Gaussian.

The parameter $w_0$ is generally fixed in an optical focusing system by the wavelength □ of the laser and by the numerical aperture ON of the focusing optic. In particular, the following relation holds, deduced from diffraction theory (Airy spot):

$$ON = \frac{a}{f} = 0.43 \times \frac{\lambda}{w_0} \quad (2)$$

With a and f the radius and the focal length of the focusing optic.

The light spot represents a certain energy fixed by adjusting the power of the laser. There is a correspondence between the intensity and the energy E0 which is the integral of the intensity I(r) in the focusing plane. The expression for the maximum intensity of the spot as a function of the energy is deduced therefrom:

$$I_0 = \frac{2 \times E_0}{\pi w_0^2} \quad (3)$$

The response threshold of the material (which was spoken about above) corresponds to an intensity Is onwards of which the material is modified.

Equations (1) and (3) give the value of the radius $r_s$ of a pattern for a spot of size $w_0$ and energy $E_0$ and for a material with intensity threshold $I_s$:

$$r_s^2 = \frac{w_0^2}{2} \ln\left(\frac{2 \times E_0}{I_s \times \pi \times w_0^2}\right) \quad (4)$$

The radius of the pattern, for a given material, is therefore dependent both on the energy of the spot and its size $w_0$.

Figure 14:
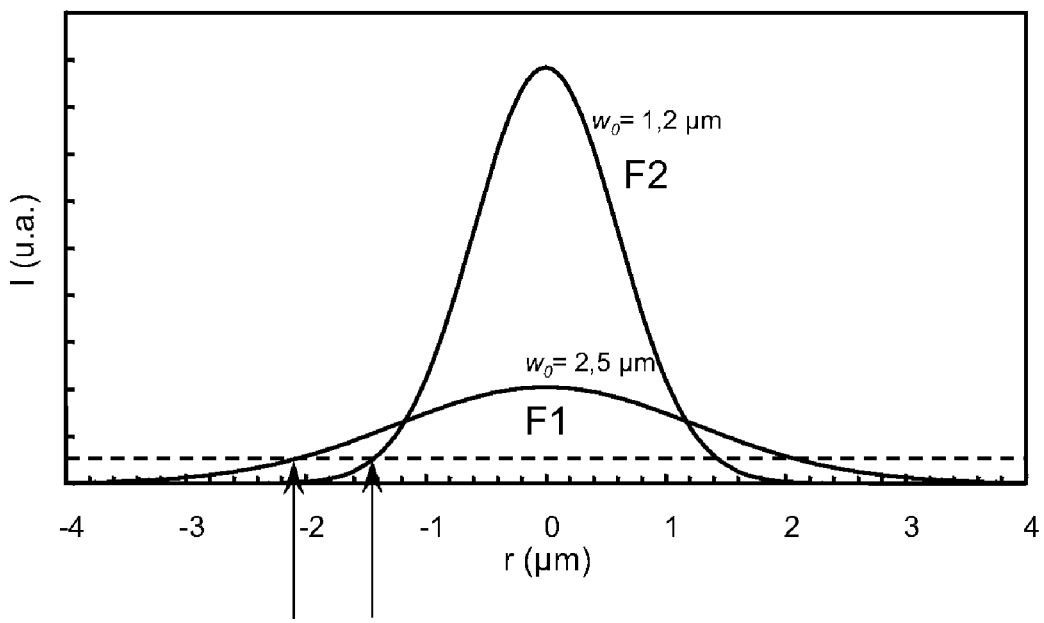
FIG. 14 represents Gaussians of energy distribution of two different laser beams.

FIG. 14 represents a graph of intensity (in arbitrary units) as a function of the distance from the centre of the beam for two laser beams F1 and F2 having focusing spot sizes of 2.5 µm and 1.2 µm. The energy $E_0=1$ is taken arbitrarily equal to a unit value $E_0=1$ for both beams. The dashed horizontal line which cuts the two curves simulates a reactivity threshold level of the material, for example equal to a quarter of the maximum intensity of the first spot. The location where the straight line cuts the curves defines the width of the pattern actually engraved by each of the beams.

In this example, the irradiation with the first beam generates a pattern of radius 2.1 µm. The intensity distribution of the second spot is narrower and leads to the formation of a pattern of 1.4 µm. To form with the second spot a pattern of size 2.1 µm it is necessary to multiply its power by a factor of greater than 20. In this case, the intensity at the centre of the spot becomes very significant and the material is at risk of being degraded.

This numerical example underlines the whole benefit of having a set of focusing lenses of various characteristics, and more particularly of different numerical apertures, so as to cover a significant interval of pattern sizes. But it is possible to alter both the numerical aperture and the power of the laser.

Figure 15:
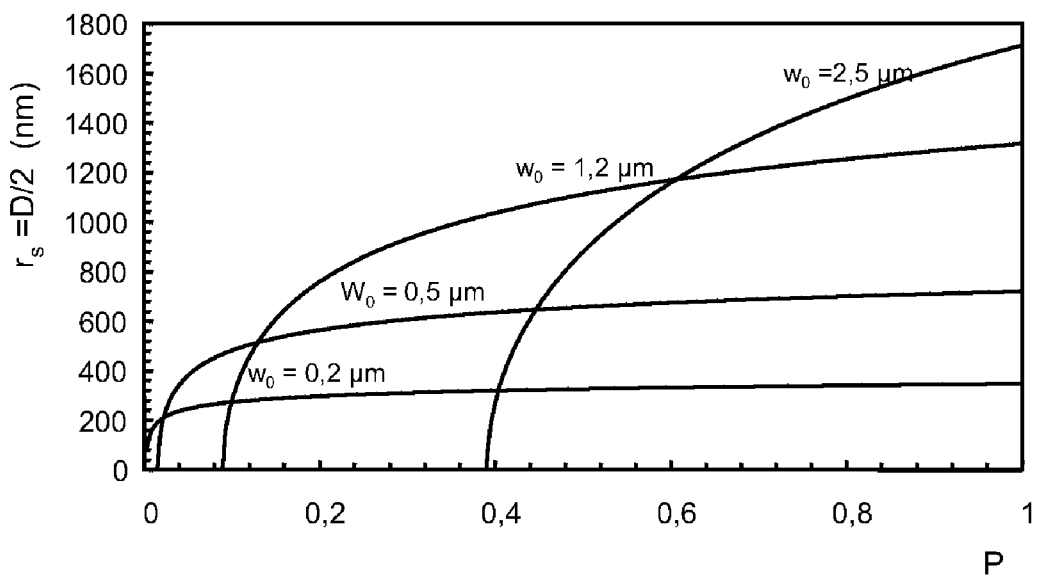
FIG. 15 represents curves defining the radius of an engraved pattern as a function on the one hand of the beam's focal spot size (related to the numerical aperture) and on the other hand of the power of the laser.

In FIG. 15, arising from equation (4), the available radii are plotted for various sizes $w_0$ and various power levels of a focused laser spot. The reactivity threshold of the material is fixed in this example at a quarter of the maximum intensity of a spot of size $w_0=2$ µm. The abscissa represents the power and the ordinate represents the radius $r_s=D/2$ of the pattern actually engraved, in nanometers.

As seen in this FIG. 15, a spot of significant $w_0$ would make it possible numerically to cover the desired pattern radius range (for example from 200 nm to 1200 nm) while a spot of low $w_0$ is limited by the power range. However, for low radius r values, a slight variation in the laser power may lead to large variations in the size of the pattern. It is therefore of benefit to use spots of smaller $w_0$ when wishing to reduce the size of the patterns so as to limit the relative error in the radius of the pattern.

Equation (4) makes it possible to give an expression for the relative error in the radius of the pattern on the basis of the relative error in the power of the spot:

$$\frac{\Delta r_s}{r_s} = \frac{1}{2\pi I_s} \times \frac{E^2}{r^2} \times \frac{\Delta E}{E} \quad (5)$$

Practical Example

Let us take the case of an image coded on a grid with spacing 800 nm. It is sought to produce a circular pattern whose size can vary, ideally linearly, from 0 to $800 \times 2^{0.5}$ nm, so as to generate the expanses of grey levels. The root 2 factor makes it possible to cover a circular area of patterns without interstices on the basis of a square grid. i.e. a pattern varying from 0 to 1.13 µm.

Let us assume that a 10% precision criterion is fixed for the laser power value and that it is then desired to limit the maximum relative error in the size of the pattern to 10%. It is possible to show that a choice of three waist values and three power values for each makes it possible to cover an interval of pattern sizes from 100 nm to 1 µm.

By way of example, to obtain a pattern of size 100 nm to 250 nm, use is made of a focused optical beam with a waist of 200 nm, the power of the beam is then between 0.02 and 0.16 (unit normalized by the maximum of the range). To obtain a pattern of size 250 nm to 600 nm, use is made of a focused optical beam with a waist of 500 nm, the power of the beam is then between 0.07 and 0.77. Finally, to obtain a pattern of size 600 nm to 1 µm, use is made of a focused optical beam with a waist of 1200 nm, the power of the beam is then between 0.41 and 1.

Two approaches can be used to make a multibeam head:
  a single beam separated into sub-beams, each modulated
    by a separate modulator,
  the use of several different lasers, write-synchronized.

In view of the availability of inexpensive lasers which can be modulated at high frequency, it is the second approach which seems the more favourable. Spots of various sizes are thereafter obtained by altering several parameters:
  the wavelength □ of the beam
  the focal length f of the lens
  the radius a of the beam exiting the lens The focal length is the most favourable solution, optionally paired with a change of beam diameter adjusted through the numerical aperture ON.

In this case, a respective focal distance is assigned to each laser, and, as will be seen, this involves a different respective distance between each of the lasers and the active layer which undergoes the action of the laser. The power of each of the lasers can then preferably be modulated in such a manner that an area of engraved pattern is the result of the combination of the choice of one of the lasers and of a power modulation of this laser.

Thus to obtain the respective spot sizes of 200, 500 and 1200 nm it is possible to start with the following parameters, with a 405-nanometer blue laser:

$w_0$=200 nm; □=405 nm; a=1.5 mm; f=1.7 mm; ON=0.87
$w_0$=500 nm; □=405 nm; a=1 mm; f=2.9 mm; ON=0.35
$w_0$=1200 nm; □=405 nm; a=1 mm; f=6.89 mm; ON=0.15

Figure 16:
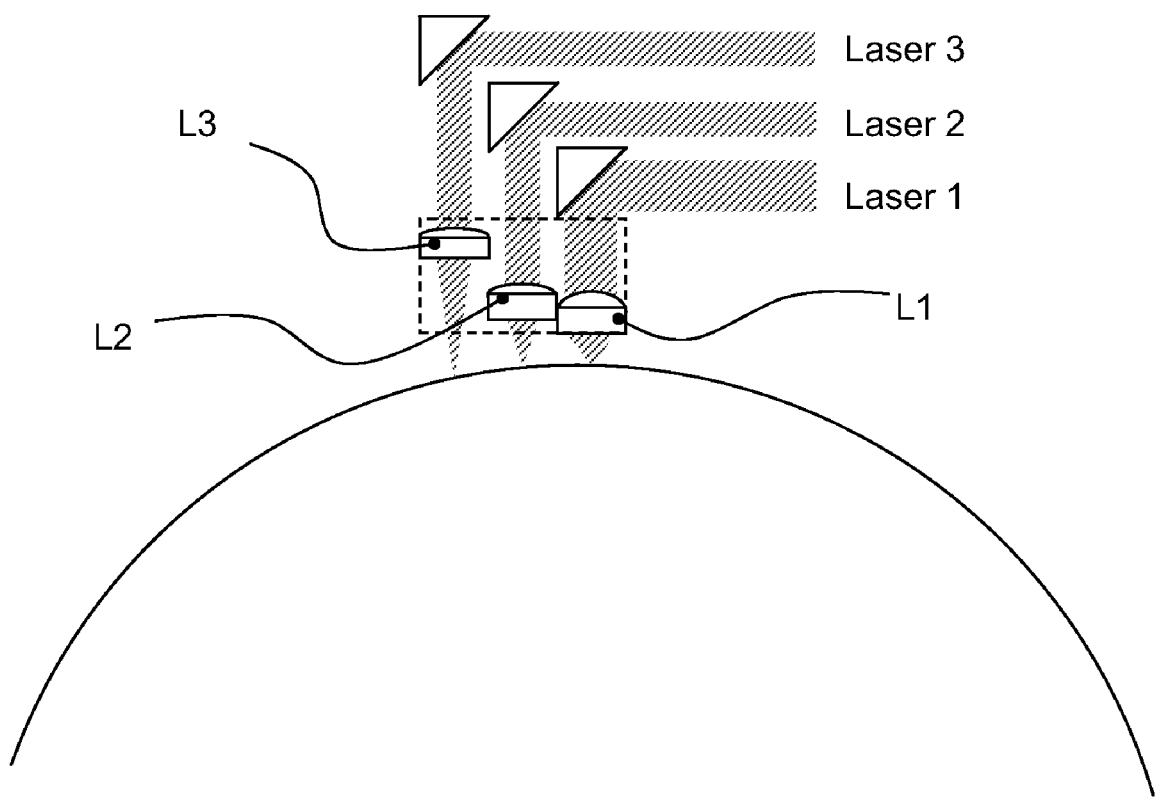
FIG. 16 represents the principle of writing with several laser beams each assigned to a determined range of grey levels.

FIG. 16 gives an enlarged view of the distribution of the focal lengths above a cylinder of radius 3.5 cm. There are three laser sources and three corresponding lenses situated at different heights above the surface of the drum 7 for focusing the beams onto the active layer. The laser sources can each be modulated in power to have for example three emission powers each. Lens 1 is the one which has the largest numerical aperture, it is therefore used to adjust the holding of focusing on the active layer; the other optics are slaved to the latter, the lenses possibly being mechanically tied together in such a manner that if the first is correctly focused on the active layer, then so also are the other two.

The focusing depth dz is related to the numerical aperture by the relation:

$$dz = \frac{2\lambda}{ON^2} \quad (6)$$

The focusing depths of the three lenses with respect to the active layer would, in the previous example, be about a micrometer for lens L1, seven micrometers for lens L2 and thirty eight micrometers for lens L3.

Fine adjustment of the positions of the lenses L2 and L3 in the direction of travel of the optical head and in the transverse direction must make it possible to tailor not only the alignment of the three lenses on one and the same track but also the relative position in the direction of travel. Thus, the shift of the optics is taken into account so that the power modulation, as well as the turning on and off, is performed in correspondence with the desired positions of the patterns to be engraved along the track by each beam.

The distance separating the spots is in fact a significant datum for guaranteeing the synchronization of the laser shots. This distance can be characterized during a calibration step in which each head measures in reflection the passage of a disturbance (aperture in a reflecting layer). Knowing the rotation rate of the cylinder, the duration of detection of the various heads makes it possible to deduce the distance of the writing points. The writing sequences on each laser are determined and synchronized accordingly.

For the inter-alignment of the heads over the trajectory of the spot a similar scheme is used by adjusting their position with respect to a disturbance present on the cylinder (linear aperture) or caused by the turning on of the first laser.

The method of storage according to the invention will be implemented in the following manner:

Initially, the recording zone 2, on flexible medium, is placed on the drum 7. A system of suction holes makes it possible to keep the flexible piece tightly clasped.

A second step will press the recording medium against the drum to guarantee optimum clasping.

The elements of the setup then start moving and the laser irradiation of the zone 2 is performed, the machine receiving successively for each pixel a numerical grey level and selecting, as a function of this level, one of the laser beams and an emission power for this beam.

Once the zone has been irradiated, it is possible to develop the storage medium if the process so requires.

The flexible storage zone is thereafter sandwiched between two protective windows during the packaging phase.

Finally, the referencing of the storage medium is performed by printing/etching/gluing one or more labels on the plastic frame. If remote referencing is necessary, using an RFID microchip, the microchip can be initialized at this juncture.

To summarize, the writing of a storage zone according to the invention allies speed of writing and high writing resolution. The motions are simple, the translation and rotation rates are constant and the grey levels are taken into account. There is no blind zone as in flat disks. It is possible to irradiate several substrates in series or in parallel, optionally using several write heads in parallel or in series. The digital processing is simple since the mesh of pixels is uniform and quasi-linear and not spiral-shaped as in conventional plane disks (curved and non-uniform mesh between the centre and the rim of the disk).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of storing images on a storage medium, comprising:
dividing the storage medium into a multiplicity of expanses of lateral dimensions less than 10 millimeters, each expanse reserved for an image to be stored, an expanse reserved for an image comprising one elementary zone for each image pixel to be stored;
scanning at least two laser beams having different numerical apertures over one of the multiplicity of expanses and writing on each elementary zone of the expanse with at least one of the lasers, at least one spot having a diameter determined in accordance with a respective gray level to be stored for the pixel, said grey level chosen from n possible levels, n being an integer greater than 2; and
repeating said scanning and writing over another expanse, wherein each of said at least two laser beams is assigned a respective range of diameters and is used for writing a spot within the respective range, whereby the image stored in an expanse is readable by optical magnification means.

2. The method according to claim 1, wherein the power of each laser can be modulated as a function of a grey level received for a determined pixel so as to define a pattern diameter corresponding to this grey level both through the choice of a laser corresponding to a range of pattern diameters and through the choice of an emission power of the laser.

3. The method according to claim 2, wherein an elementary zone corresponding to a pixel is divided into K sub-zones each able to receive a pattern having a diameter taken from among n=N/K possible diameters, N being the total number of grey levels desired for each pixel.

4. The method according to claim 1, wherein an elementary zone corresponding to a pixel is divided into K sub-zones each able to receive a pattern having a diameter taken from among n=N/K possible diameters, N being the total number of grey levels desired for each pixel.

* * * * *